United States Patent [19]

Nastasi

[11] Patent Number: 5,040,400

[45] Date of Patent: Aug. 20, 1991

[54] POWER ACTUATED TOOL FOR INSTALLING METAL CORNER STRIP

[75] Inventor: Thomas Nastasi, Stamford, Conn.

[73] Assignee: G.L. Group, Ltd., Nassau, The Bahamas

[21] Appl. No.: 625,160

[22] Filed: Dec. 10, 1990

[51] Int. Cl.[5] .................. B23P 11/00

[52] U.S. Cl. .................. 72/325; 72/453.16; 72/481; 29/243.5

[58] Field of Search .................. 72/325, 413, 481, 407, 72/453.16, 453.15, 391.4; 29/243.5, 243.56, 243.57, 243, 528; 227/119, 108, 130, 131, 140, 148, 152

[56] References Cited

U.S. PATENT DOCUMENTS

| | | | |
|---|---|---|---|
| 969,471 | 9/1910 | Grossman . | |
| 2,267,206 | 12/1941 | Lopes, Jr. | 1/11 |
| 2,605,467 | 8/1952 | Lind | 72/407 |
| 2,859,445 | 11/1958 | Larrabee | 1/260 |
| 2,921,315 | 1/1960 | Albrecht | 72/407 |
| 2,944,262 | 7/1960 | Richman et al. | 1/260 |
| 3,023,417 | 3/1962 | Michel | 1/187 |
| 3,029,436 | 4/1962 | Kufel, Jr. et al. | 1/48 |
| 3,160,890 | 12/1964 | Lefebvre | 1/187 |
| 3,526,944 | 9/1970 | Cherup | 29/212 |
| 3,670,941 | 6/1972 | Grinnell et al. | 227/8 |
| 3,810,495 | 5/1974 | Pack | 140/93 |
| 4,288,016 | 9/1981 | Failla et al. | 227/30 |
| 4,558,584 | 12/1985 | Myers | 72/407 |
| 4,670,957 | 6/1987 | Wolford | 29/243.5 |
| 4,700,876 | 10/1987 | Wingert | 227/131 |
| 4,893,493 | 1/1990 | Jacques | 72/325 |
| 4,989,438 | 2/1991 | Simon | 72/325 |

*Primary Examiner*—Daniel C. Crane

*Attorney, Agent, or Firm*—Kramer, Brufsky & Cifelli

[57] ABSTRACT

A power actuated tool for attaching a protective metal strip to the outside corner formed by two intersecting wall panels is provided. The tool includes a shoe releasably mounted on the tool for holding the tool and the protective strip in alignment along the corner. The shoe is provided in a number of differing shapes, each one of which complements the contour of an associated protective strip, which are interchangeably mountable on a power actuator for activating an attaching means for securing the metal strip to the wall. The shoe is rotatable relative to the power actuator so that a myriad of relative positions may be assumed by the shoe with respect to the power actuator in order to enable the tool to be used where limited space is available to hold and attach the protective strip.

6 Claims, 2 Drawing Sheets

POWER ACTUATED TOOL FOR INSTALLING METAL CORNER STRIP

BACKGROUND OF THE INVENTION

1. Field of the Invention

This invention relates to a tool for installing a protective corner strip along a corner formed by two intersecting wall panels of, for example, sheetrock or gypsum board. More specifically, this invention relates to a hand held power actuated tool usable for attaching a protective corner strip to wall corners of differing contour.

2. Description of the Prior Art

The outside corners of sheetrock or gypsum board walls are customarily finished by attaching a metal strip having a shape which complements the contour of such corners. After the strip is attached to the wall it is covered with joint compound which, after hardening, substantially conceals the protective strip.

The metal strip is sometimes attached to the wall by nailing, however, it is more often attached by forming several indentations or crimps in the side portions of the strip which project into the wall material. Heretofore, the indentations and corresponding projections have been formed using a tool which, when struck with a hammer, simultaneously drives a pair of chisel shaped crimping elements into the opposite sides of the metal strip. The tool is manufactured by the Goldblat Tool Company, Cincinnati, Ohio.

To operate such a tool, a workman must simultaneously manipulate the metal strip, the crimping tool and a hand-held hammer. That is, the workman must with one hand hold the strip in alignment with the corner of the wall and, with the same hand, hold the crimping tool in alignment with the metal strip. When the strip is in alignment with the wall and the tool is aligned with the strip, the workman uses his free hand to strike the tool with the hammer to simultaneously drive the crimping elements into either side of the strip thus attaching the strip to the wall. The workman must be careful to avoid damaging the wall and must strike the crimping tool squarely to avoid breaking metal particles off of the tool which might cause injury. In fact, a warning label attached to the tool expressly cautions of the danger posed by such particles.

In addition to the problems just noted, the Goldblat device is useful only for attaching a protective strip having a shape which complements a right angle-outside wall corner. This presents a serious disadvantage since outside wall corners are commonly formed at angles other than 90° or with rounded contours.

In co-pending application Ser. No. 423,950, filed Oct. 19, 1989, and assigned to the same assignee as the present application, an improved tool which overcomes many of the aforesaid problems is disclosed. More specifically, various embodiments of a power actuated tool usable for attaching a protective strip to wall corners of differing contour is proposed, which substantially reduces the manipulations required with the hand tool and the possibility of industrial accidents. Further, no extraneous implements such as a hammer is required to strike the tool, as the force to do so is self-contained within the tool, and corners near ceilings and adjacent floors may be installed since extraneous striking implements need not be swung in an arc to obtain an effective force applied to the attaching means or crimping elements.

The protective strips are also provided in a number of differing shapes, each one of which complements the contour of the corner to which it is attached. The power tool comprises a shoe releasably mounted on the tool for holding the protective strip and the tool in alignment along the corner. The shoe is provided in a number of differing shapes, each one of which has a contour substantially complementing the contour of an associated protective strip. Since the shoe is releasably mounted on the tool, a shoe having the desired contour is selected from a number of interchangeable shoes of differing shape and mounted on the device to complement the contour of the particular strip being attached.

The power tool further comprises means for releasably mounting the shoe and attaching means comprising crimping elements supported on the shoe for movement between an inactive position wherein the attaching means are out of engagement with the protective strip held by the shoe and an attaching position wherein the attaching means engage and attach the protective strip into holding engagement with the wall panels. Operating means for moving the attaching means from the inactive to the attaching position, biasing means for normally maintaining the attaching means in the inactive position, and power operated means mounted on the shoe and operably connected to the operating means for activating the operating means to move the attaching means to the attaching position are also provided.

SUMMARY OF THE INVENTION

While the power tool of U.S. Pat. No. 4,989,438 overcame many of the disadvantages associated with the prior art manual device for installing a metal corner strip, the present invention discloses a power tool which has been improved further. Particularly, the entire head including the attaching means and the specifically contoured shoe can be readily replaced so a differently contoured shoe, depending on the contour of the corner and protective strip, can be substituted with facility, as needed. In the tool of U.S. Pat. No. 4,989,438, it was necessary to provide removable fasteners between the attaching means and shoe wherein the fasteners would first have to be removed to uncouple the attaching means from the shoe, and then, the shoe removed and replaced with one having a different contour and the fasteners replaced to couple the attaching means to the shoe in their inactive position. Further, the shoe on the head of the tool of the present invention can be rotated and locked in 90° spaced, relative positions on the tool relative to a pistol grip housing to enable the tool and the attaching means on the crimping head to be positioned at various angles relative to the work and the tool to be used in cramped and overhead areas.

BRIEF DESCRIPTION OF THE DRAWINGS

Further objects and advantages of the invention will become apparent from the following description and claims and from the accompanying drawings, wherein:

DETAILED DESCRIPTION OF THE PREFERRED EMBODIMENT

Figure 1:
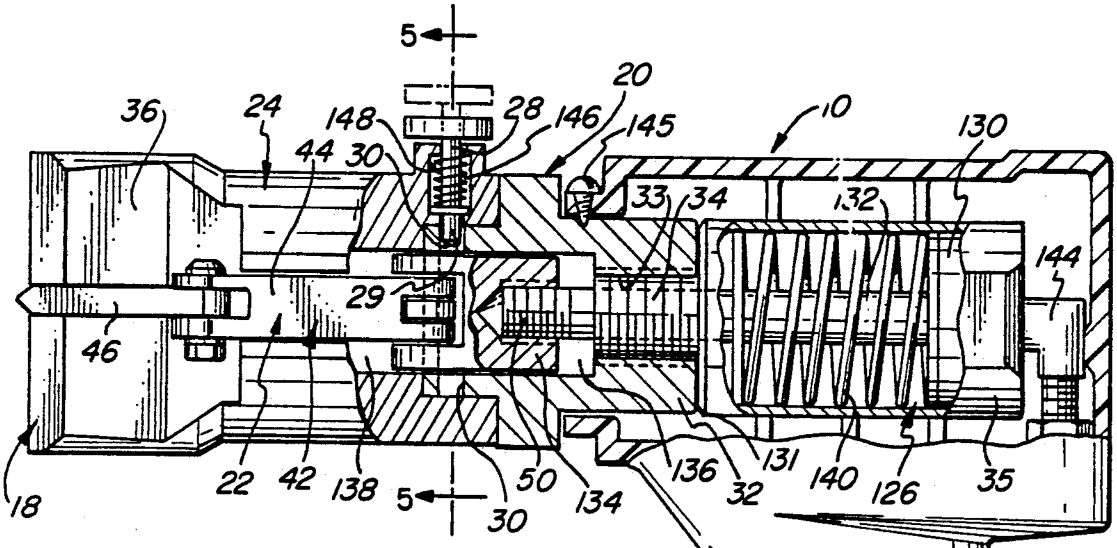
FIG. 1 is a fragmentary side elevational view, partly in section, of the power actuated tool of the present invention.
Figure 1:
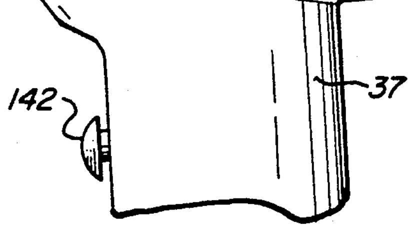

Referring now to the drawings in detail, wherein like numerals indicate like elements throughout the several views, the tool 10 of FIG. 1 is designed to fasten a protective corner strip to complement the contour of a right angle-outside wall corner. The strip (not shown) is customarily made from sheet metal and comprises an angle member having two normally disposed and intersecting sides which are adapted to overlie the edges of the wall panels when the strip is positioned on the corner formed by the intersecting panels. After the strip is attached to the wall with the tool 10, the corner is finished using a suitable joint compound which, after hardening, conceals the strip. Alternatively, the protective strip may have a shape which complements an arcuate or rounded outside wall corner.

Figure 2:
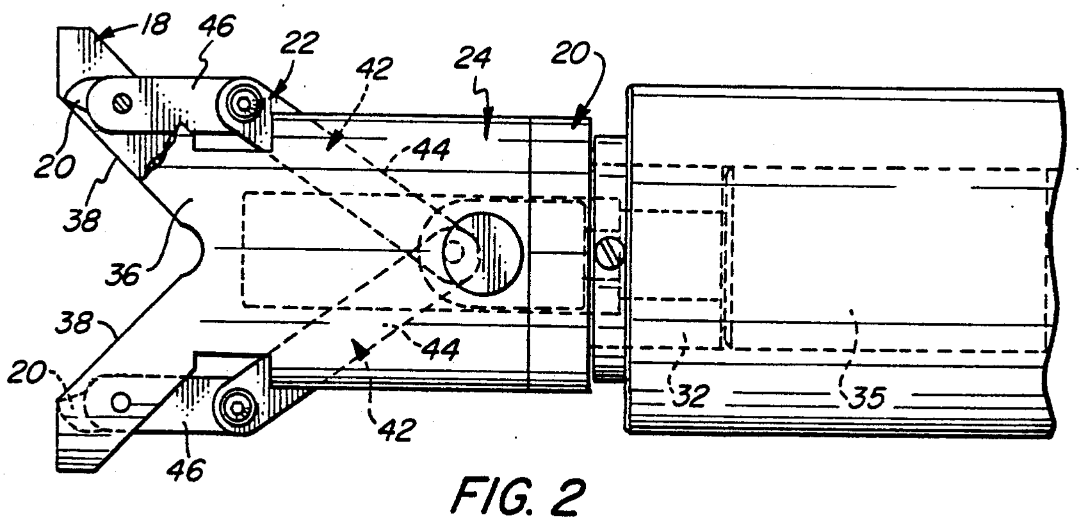
FIG. 2 is a fragmentary top plan view, partially in section, of the tool of FIG. 1, and the crimping elements of the tool in an inactive position.
Figure 4:
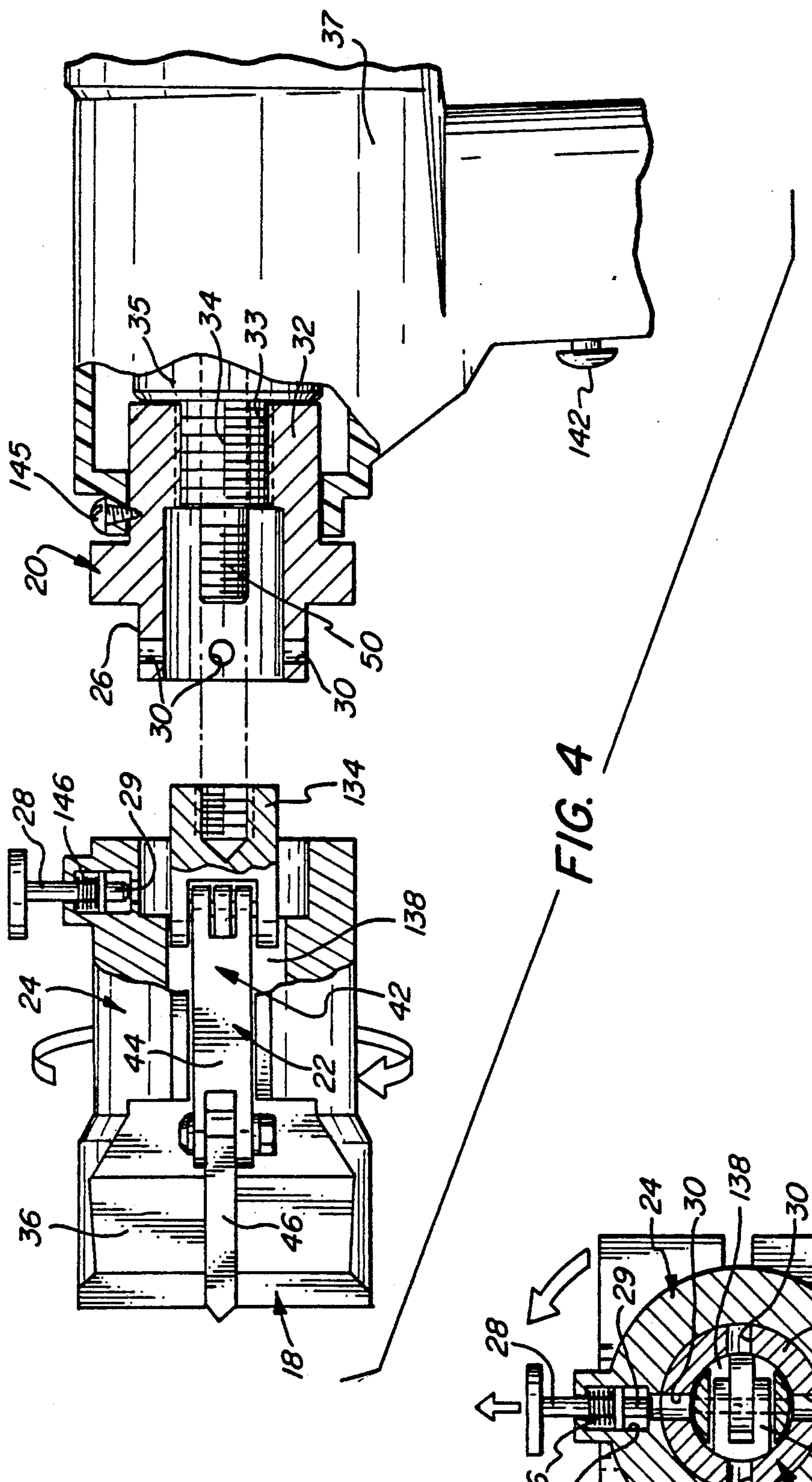
FIG. 4 is a view similar to FIG. 1 but illustrating the manner in which the head of the tool can be removed and replaced so as to provide a head with a predetermined contour.
Figure 5:
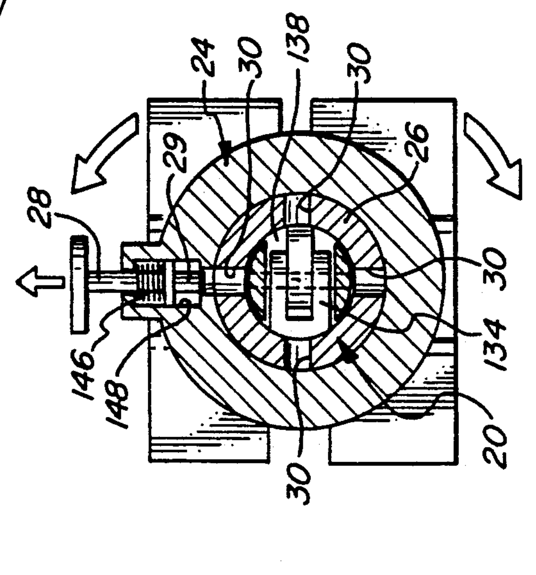
FIG. 5 is a cross-sectional view taken substantially along the plane indicated by line 5—5 of FIG. 1, illustrating the manner in which the head can be rotated to a different angle or orientation relative to the work to facilitate use of the tool.

Referring now to FIGS. 1 and 2, the tool 10 includes a shoe 18 constructed to engage and complement the shape of the protective strip and hold the strip and the tool 10 in alignment with the corner during the attaching procedure. The shoe 18 is preferably made from light-weight rigid material such as aluminum or plastic and comprises an angle member 36 defining angularly disposed abutment surfaces 38,38. The shoe is constructed so that abutment surfaces 38,38 engage and substantially complement the sides of the protective strip to be applied to the corner when the strip is held in place along the corner. In its most preferred embodiment, the shoe 18 is constructed so that abutment surfaces 38,38 are disposed at an angle slightly less than 90° to insure that sides of a right angle corner strip are firmly pressed against the wall panels during the attaching procedure. The abutment surfaces 38,38 permit the elongated shoe to maintain the strip and tool 10 in alignment with the corner during the attaching procedure.

As noted previously, the tool 10 can be provided with a number of interchangeable shoes 18 of differing shape, each one of which has a contour complementing the contour of at least an associated portion of a selected protective strip. Mounting of the interchangeable shoes 18 on tool 10 is described in more detail hereinafter.

The tool 10 further includes a pair of chisel-shaped crimping elements 20,20 pivotally supported on shoe 18. The crimping elements are movable between an inactive position shown in FIG. 2 and a crimping position extending beyond the abutment surfaces 38,38 of shoe 18. In the inactive position, the edges of the crimping elements 20,20 do not project beyond the abutment surfaces 38,38. When the crimping elements are driven into crimping position, the edges project beyond the abutment surfaces 38,38 to deform the metal corner strip received within shoe 18, and thereby attach the strip to a pair of intersecting the wall panels.

Figure 3:
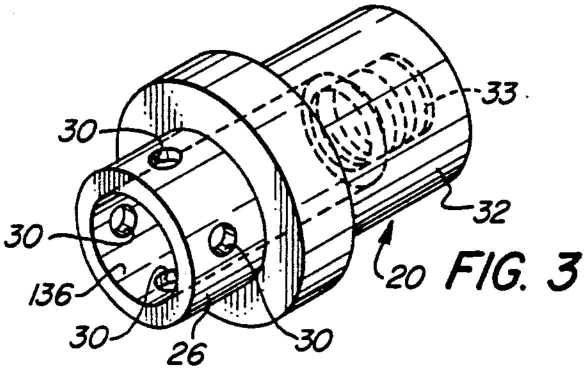
FIG. 3 is a perspective view of the attaching ferrule for the head of the tool of FIG. 1 which holds the crimping elements.

The crimping elements 20,20 comprise an integral part of a toggle mechanism 22, which moves the crimping elements between their inactive and crimping positions. The toggle mechanism includes a pair of opposite handed linkages 42,42. Each linkage 42 has two link members 44 and 46 which are pivotally joined to each other. The toggle mechanism 22 is connected to a reciprocating shaft 50, received through a ferrule 29 (FIG. 3) mounting a cylindrical head 24 which in turn houses the toggle mechanism 22. The head 24 is rotatably supported on the cylindrical front portion 26 of ferrule 20 and can be attached to the ferrule 20 to preclude rotation of the head by the entry of the tip 29 of a spring-biased pin 28 housed within a chamber in the rear of head 24 in one of four holes 30 spaced 90° from each other about the circumference of the front portion 26 of the ferrule. The rear cylindrical body portion 32 of ferrule 20 has a bore 33 threadedly received on a threaded shaft 34 extending from a fluid motor cylinder or housing 35 within the interior of a pistol grip housing 37. A set screw 145 inserted between the front portion of housing 37 and ferrule rear body portion 32 precludes separation of the ferrule 20 from housing 37.

Referring again to FIG. 1, the toggle mechanism 22 is operated by a fluid, such as an air-powered actuator partially within fluid motor cylinder housing 35. The actuator includes cylinder or housing 35 having the pistol grip housing 37 surrounding it. The shaft 50 is supported within cylinder or housing 35 for reciprocating movement between a forward position and a rearward position. Shaft 50 is reciprocated by a pneumatic piston assembly 126 within cylinder 35, which comprises a piston 130 connected to a piston rod 132, which in turn is surrounded by a coil spring 140 compressible in cylinder 35 between piston 130 and a bottom wall 131 of cylinder 35. The rod 132 is connected at its rearward end to piston 130 and forms the threaded reciprocating shaft 50 at its forward end which is threadedly connected to toggle mechanism 22 by means of a cylindrical slide 134, slidably mounted in contiguous, abutted cylindrical chambers 136,138 of the ferrule 20 and head 24, respectively, of tool 10.

When not in operation, piston 130 is biased by means of spring 140 in the position shown in FIG. 1, where the piston is to the extreme right in cylinder 130. With the piston in this position, the crimping elements 20 extend just flush with or slightly beyond the abutment surfaces 38,38 of the shoe 18. When a trigger switch 142 is closed on pistol grip housing 37, compressed air is introduced into cylinder 35 via hose 144 in a manner well-known in the art, causing piston 130, piston rod 132, shaft 50 and slide 134 to move to the left as viewed in FIG. 1. A more complete description of the pneumatic operation of the device is detailed in U.S. application Ser. No. 423,950, which is incorporated herein by reference. As the slide 134 moves to the left in FIG. 1, crimping elements 20,20 are moved to their crimping position by toggle mechanism 22 to attach a protective strip received within shoe 18 to a wall corner. The compressed air may be supplied from a portable compressor (not shown) carried on the workman's tool belt. Such compressors are compact battery powered units which are well known to those skilled in the art. Upon release of trigger switch 142, compressed spring 140 returns the piston 130 to the position illustrated in FIG. 1, exhausting air from the cylinder 35.

As noted above, the crimping elements are mounted on the shoe 18 and the shoe is itself fixed to the front of head 24 which in turn is releasably coupled to the ferrule 20. Thus, the shoe 18 can be interchanged with other shoes of differing shape enabling a workman to quickly and easily adapt the tool 10 to attach a protec-

BEST AVAILABLE COPY tive strip to wall corners of differing contour by simply raising the head of pin 28 to remove tip 29 from one of the holes 30 in which it is seated, and rotating the complete head 24 including the toggle mechanism 22 and crimping elements 20, unthreading cylindrical slide 134 from shaft 50 and substituting another head 24 having a shoe 18 of different contour on shaft 50, all other elements of the new or substituted head 24 being the same.

Also, by raising the head of pin 28 against the bias of a coil spring 146 in the chamber housing the pin in the rear of head 24, the tip 29 of pin 28 can be removed from a hole 30 and the head 24 and shoe 18 rotated on the front body portion 26 of ferrule 20 relative to ferrule 20 and pistol grip housing 37 about shaft 50 from 90° to 270° at 90° intervals and the pin tip 29 repositioned in another of holes 30. This enables the head 24 and shoe 18 to be reoriented relative to the work corner where tight space would preclude a direct alignment and orientation of the shoe and pistol grip housing 37 with the corner or facilitates reorientation of the head 24 relative to the pistol grip housing 37 for overhead use on laterally extending corners, e.g., where a ceiling corner is being formed.

While the present invention has been described in one particular embodiment, modifications may be made therein by a person skilled in the art without departing from the scope of the invention as expressed in the following claims.

I claim:

1. A tool for attaching a protective strip to the corner formed by the intersection of two wall panels, said protective strip provided in a plurality of shapes, each of said shapes generally complementing the contour of an associated corner, said tool comprising:

shoe means for holding the protective strip and the tool in alignment with the corner, said shoe means selected from a plurality of shoes of differing shape, each of said shoes having a contour substantially complementing the contour of at least an associated portion of a selected protective strip;

attaching means supported on the shoe means for movement between an inactive position wherein said attaching means are out of engagement with attaching position wherein said attaching means and an engage and attach the protective strip to each of the wall panels;

operating means on said shoe means for moving said attaching means from said inactive position to said attaching position;

power operated means connected to said operating means for actuating said operating means to move said attaching means to said attaching position;

means for connecting said operating means to said power operated means;

biasing means associated with said power operated means for normally maintaining said attaching means in said inactive position; and means for releasably mounting said shoe means on said power operated means;

whereby said shoe means can be removed from said power operated means and replaced with a shoe means of different shape and contour;

said releasable mounting means including:

a ferrule threadedly connected to said power operated means having a portion rotatably seating said shoe means;

lock means carried by said shoe means for insertion in said ferrule portion to fix the relative orientation of said shoe means and ferrule, said lock means including:

a pin on said shoe means adapted to be selectively inserted in one of a plurality of holes formed about the circumference of said ferrule.

2. The tool of claim 1 wherein said holes are spaced at 90° intervals about the circumference of said ferrule.

3. The tool of claim 2 including means for preventing rotation between said ferrule and power operated means.

4. The tool as set forth in claim 1 wherein said operating means comprises a toggle linkage and said attaching means comprises crimping elements integrally formed on the ends of links comprising said linkage, said crimping elements movable between an inactive position wherein said crimping elements are out of engagement with the protective strip held by the shoe means and a crimping position wherein said crimping elements engage and crimp the protective strip into holding engagement with the wall panels.

5. The tool as set forth in claim 1 wherein said power operated means comprises a pneumatic piston and cylinder assembly having a reciprocally movable piston connected to said operating means and said biasing means comprises a piston return spring associated with said assembly.

6. The tool as set forth in claim 5 wherein said shoe means is threadedly connected to said piston.

* * * * *